(12) United States Patent
Lee et al.

(10) Patent No.: US 7,248,388 B2
(45) Date of Patent: Jul. 24, 2007

(54) OPTICAL SCANNER

(75) Inventors: Ta-Yi Lee, Chung-Ho (TW); Tung-Fu Hsieh, Jhubei (TW); Hsiao-Li Kao, Shenyiang (TW)

(73) Assignee: Lite-On Technology Corporation, Taipei (TW)

(*) Notice: Subject to any disclaimer, the term of this patent is extended or adjusted under 35 U.S.C. 154(b) by 493 days.

(21) Appl. No.: 10/812,076

(22) Filed: Mar. 30, 2004

(65) Prior Publication Data

US 2005/0219647 A1    Oct. 6, 2005

(51) Int. Cl.
*H04N 1/04* (2006.01)

(52) U.S. Cl. .................... 358/475; 358/497; 358/461; 358/527

(58) Field of Classification Search ................ 358/475, 358/486, 461, 497, 494, 474, 409, 412, 509, 358/505, 527; 382/274, 312, 318, 319; 250/234–236; 399/207
See application file for complete search history.

(56) References Cited

U.S. PATENT DOCUMENTS 6,229,627 B1 * 5/2001 Taguchi et al. ............. 358/461
6,747,765 B2 * 6/2004 Kitamura et al. ........... 358/497

FOREIGN PATENT DOCUMENTS

JP        2001230910 A  *  8/2001

* cited by examiner

*Primary Examiner*—Cheukfan Lee
(74) *Attorney, Agent, or Firm*—Rabin & Berdo, P.C.

(57) ABSTRACT

An optical scanner includes a first reference white board and a second reference white board perpendicular to two sides of a glass window that holds an object to be scanned. When the optical scanner is powered on, the optical module scans the first reference white board and the second reference white board to obtain data of image quality test and brightness variations in Y direction first, and through software compensation and correction, to obtain a normal digital image data thereby to achieve rapid preview and scanning.

8 Claims, 2 Drawing Sheets

OPTICAL SCANNER

FIELD OF THE INVENTION

The present invention relates to an optical scanner and particularly to an optical scanner for rapid preview and scanning.

BACKGROUND OF THE INVENTION

A scanner is an image-capturing device. Take a conventional platform scanner for example; its basic elements include a glass window for holding a scan object (maybe a document or picture) and an optical module for transforming images to electric signals. The core element of the optical module is an image sensor and a lens for focusing and forming an image on the image sensor. The image sensor (such as charge couple devices; CCD) has many image-sensing pixels, which accumulate electric charges when receiving different light intensities to form voltage differences. Those light intensities are different from those transformed to digital electric signals through an A/D converter. The original digital electric signals can be converted to electronic files. Then users can process image processing, editing, storing, and outputting through computer software.

Refer to FIG. 1 shows the scanning process for a picture from start to finish on a conventional scanner. The description of the process is as follows:

First, confirm that warm up of the lamp is finished (step 11). This step requires some time to enable the brightness of the entire lamp to rise to a stable condition.

Next, AFE (analog front end) data captured by an image capturing front controller are compensated and corrected (step 12). In the conventional art, the AFE can be combined with an image sensor or be present as an independent chip, and the AFE is utilized to convert the analog signal to a digital signal after scanning. This step is to calculate the CCD output-value according to the following equation (1):

$$\text{gain} \times (\text{CCD output-value} + \text{offset}) \qquad (1)$$

Then, perform pixel-shading pixel to pixel (step 13). This step is to compensate the brightness of every pixel to a desired value so that a uniform brightness is reached before scanning. This serves as the standard for compensating the later scanning object.

Start scanning for the targeted object (step 14) after all prior steps have been completed.

Conventional scanners mostly use a cold cathode fluorescent lamp (CCFL). While CCFL has many advantages such as greater brightness, lower electric power consumption, longer service life, and the like, it also has a big drawback. Namely: whenever a user restarts scanner operation, the scanner has to go through a warm up period to enable the brightness of the lamp to reach a stable condition in order to start the scanning of the picture. Hence at step 11, warm up time takes considerable time.

At room temperature the warm up time could last about 1-3 minutes. In colder areas the warm up time is longer. This is quite inconvenient. Some users even mistakenly deem the long warm up time as a machine failure and send the machine back for repairing.

In the present highly competitive environment, how to shorten the waiting time period when the scanner is cold started is an important issue.

SUMMARY OF THE INVENTION

In view of the problems set forth above, the object of the present invention is to provide an optical scanner that includes a glass window, an optical module, a first reference white board and a second reference white board.

The first reference white board is located on one side of the glass window and the second reference white board is located on another side of the glass window perpendicular to the first reference white board.

After the optical scanner has been powered on, the image sensor and the AFE of the optical module first sense the first reference white board to perform an image quality test. Meanwhile, the warm up of the lamp of the optical module is still not finished; hence, the image sensor and the AFE of the optical module sense in the Y direction along the second reference white board, to obtain brightness variation of every spot in the Y direction.

Thus by means of the result of the image quality test and the brightness variation of every spot in the Y direction, the stable brightness of the lamp may be simulated. Through software compensation and correction, more normal digital image data may be obtained. Thus scanning may be started without waiting for the brightness of the entire lamp to reach a stable condition, and an instant preview or scan can be achieved.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
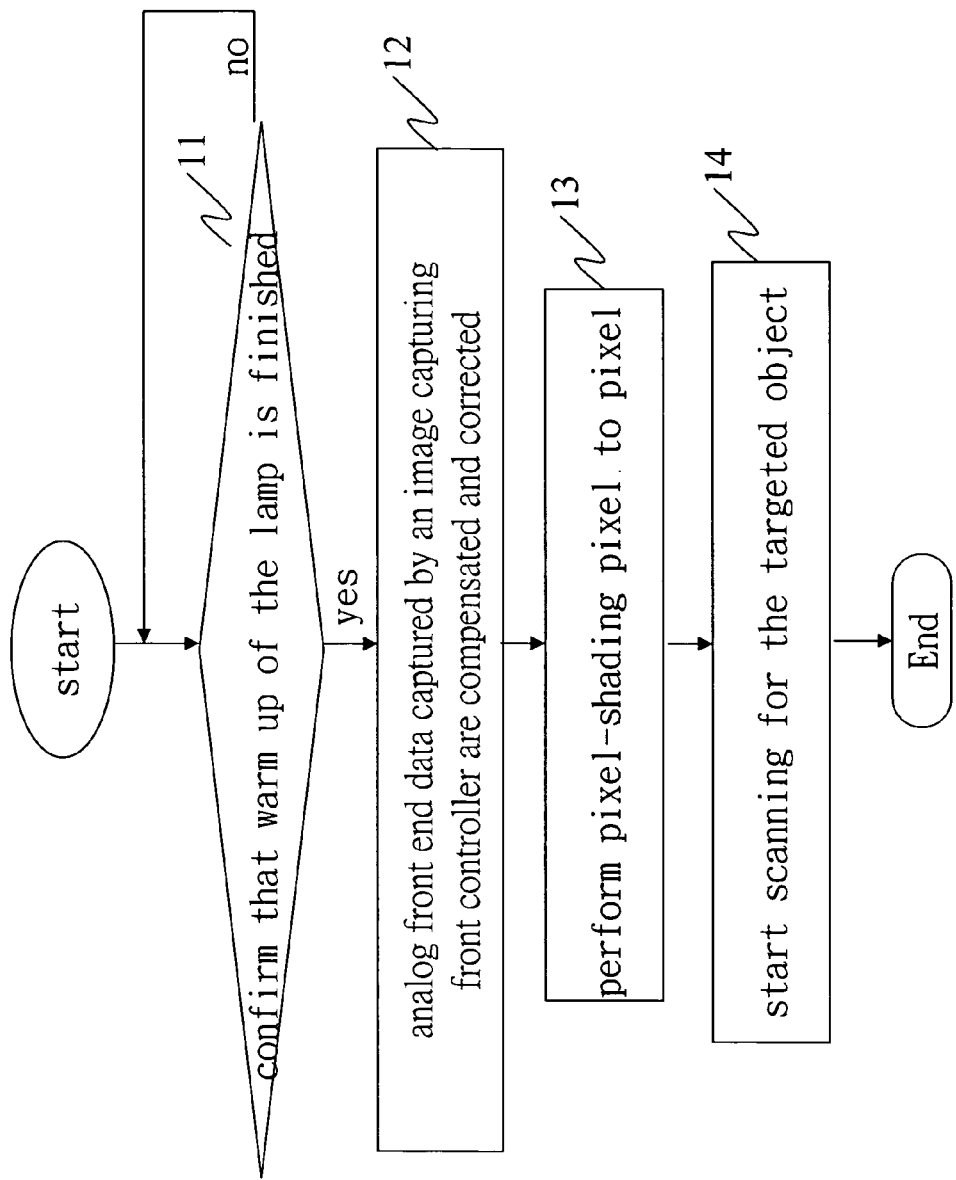
FIG. 1 is a process flow chart of a conventional scanner from start, complete warm up and start scanning a picture.
Figure 2:
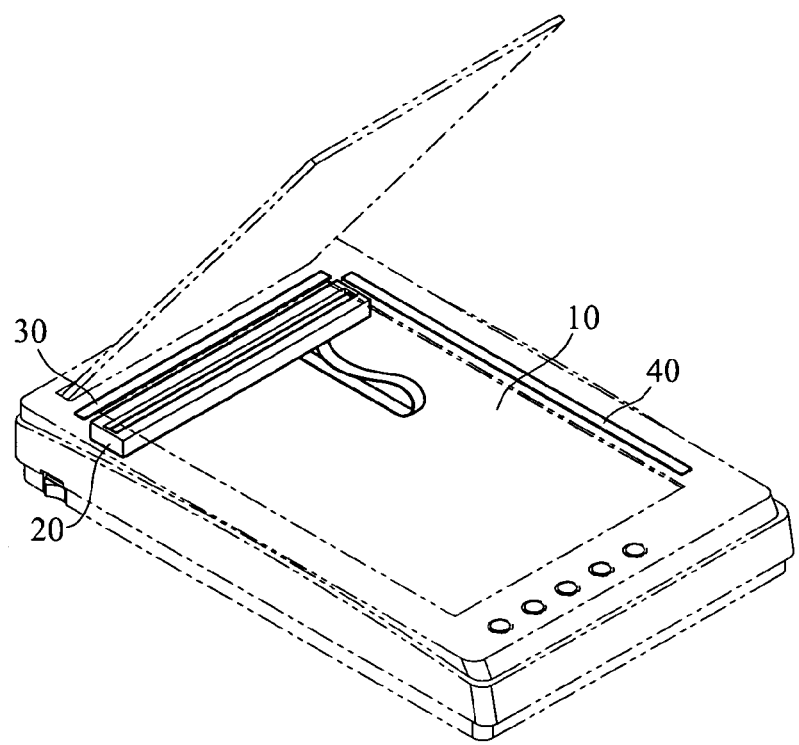
FIG. 2 is a schematic view of a first embodiment of the optical scanner of the invention.

Refer to FIG. 2 for a first embodiment of the optical scanner of the invention. It mainly includes a glass window 10, an optical module 20, a first reference white board 30 and a second reference white board 40.

The glass window 10 is for holding an object to be scanned. The optical module 20 is movable relative to the glass window 10. Its main elements include a lamp (such as CCFL), lens, an image sensor, A/D converter (such as an AFE), etc.

The lamp emits light projecting to the object to be scanned on the glass window 10. Take a black and white picture as an example, the light emitted from the lamp hits the black or white spots, and the reflecting light is different. The reflected light passes through the lens and focuses. The image sensor transforms the optical signals to analog signals. The analog signals are converted by the A/D converter, such as an AFE, to become digital image data. The digital image data are sent to a computer host. Coupled with software such as a TWAIN driving program, image processing, word recognition, etc., the image may be edited.

The first reference white board 30 is located on one side of the glass window 10. When the optical scanner is powered on, the image sensor and the AFE the optical module 20 first sense the first reference white board 30 to perform an image quality test.

The first reference white board 30 is a totally white board. Assume the corresponding value of the white color is 240 as an example in this embodiment only (it may be set with other value). This value is a preset value, which can be stored in the software of a drive program or burned into firmware; in this embodiment, the value of 240 is burned into the image sensor. The image sensor and the AFE of the optical module 20 detect the value of the first reference white board 30 (at this time the lamp is still at the warm up stage. Hence output value of the image sensor and the AFE of the optical module 20 is not necessarily 240) which is compared with the corresponding value 240 of the white color, and an AFE data is obtained. Then the AFE data may be used to correct output image.

The second reference white board 40 is perpendicular to the first reference white board 30 and is located on another side of the glass window 10. After the optical scanner has been powered on and the image quality test is completed, the optical module 20 is coordinated and moved in the Y direction (the second reference white board 40) to perform selected positioning operations for a sensing process and to enable the brightness of the lamp to reach a stable condition.

By means of the invention, the optical module 20 can move in the Y direction, and use the dummy pixels on two sides of the image sensor to sense the second reference white board 40 and measure the brightness of every spot in the Y direction, to obtain brightness variations in the entire Y direction.

Therefore the image sensor and the AFE of the optical module 20 can sense the first reference white board 30 to obtain a value and to gain AFE data by comparing the value with the corresponding value through the image sensor and the AFE of the optical module 20, and then the image sensor and the AFE of the optical module can sense the second reference white board 40 to obtain brightness variations in the Y direction. Finally, through software compensation and correction, normal digital image data may be obtained.

When the optical module 20 processes scans in the Y direction the first time, the AFE data and brightness variations in the Y direction are used to simulate the warm up finished condition of the lamp (i.e. the lamp with a stable brightness), so that instant preview or scanning starts without waiting the lamp to reach a stable brightness. Thus waiting time of cold start prior to scanning may be shortened.

Aside from using the dummy pixels on two sides of the image sensor to sense the second reference white board 40 to obtain brightness variations in the Y direction, an additional photosensitive diode may be mounted on one side of the image sensor 20 and the AFE of the optical module to sense and measure the brightness of every spot of the second reference white board 40 in Y direction. The brightness variations in the entire Y direction are also obtained. Then use the obtained AFE data and brightness variations in the Y direction, and through software compensation and correction, to obtain the normal digital image data.

Figure 3:
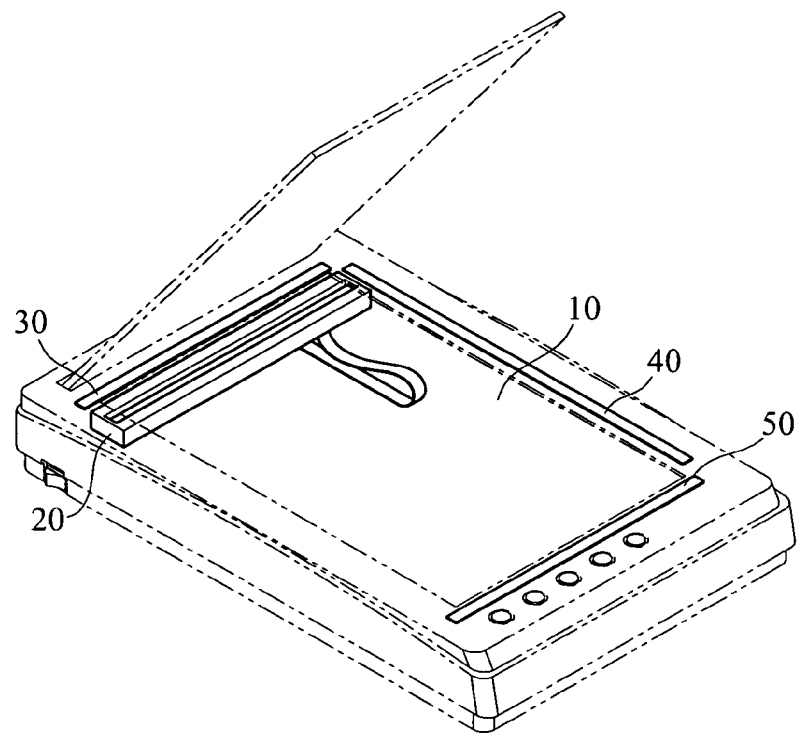
FIG. 3 is a schematic view of a second embodiment of the optical scanner of the invention.

Refer to FIG. 3 for a second embodiment of the invention. It is substantially constructed like the first embodiment. However, a third reference white board 50 is provided and located on another side of the glass window 10 perpendicular to the second reference white board 40.

After the optical scanner has been powered on and has finished an image quality test, the image sensor and the AFE of the optical module 20 sense the second reference white board 40 to obtain brightness variations in the Y direction, and scans the third reference white board 50 to obtain required data. Through software compensation and correction, more accurate digital image data than the first embodiment may be obtained. It also can achieve rapid preview or scanning.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. An optical scanner, comprising:
    a glass window, for holding an object to be scanned;
    an optical module, which is movable relative to the glass window and includes an image sensor for transforming an image of the object to an electric signal for outputting, and generating digital image data;
    a first reference white board, located on one side of the glass window; and
    a second reference white board, corresponding the first reference white board;
    wherein the image sensor measures the first reference white board and the second reference white board to obtain AFE (analog front end) data and brightness variations in a Y direction to compensate the digital image data when the optical scanner is powered on, thereby to perform quick scanning or preview.

2. The optical scanner of claim 1, wherein the first reference white board is perpendicular to the second reference white board.

3. The optical scanner of claim 1, further comprising a third reference white board perpendicular to the second reference white board and in parallel with the first reference white board.

4. The optical scanner of claim 1, wherein the image sensor of the optical module cooperates with the second reference white board to measure the brightness variations in the Y direction.

5. The optical scanner of claim 1, further comprising a photosensitive diode located on one side of the optical module to cooperate with the second reference white board to measure the brightness variations in the Y direction.

6. An optical scanner, comprising:
    a transparent window, for holding an object to be scanned;
    a light source for illuminating the object;
    an optical module, which is movable in a Y direction relative to the glass window and which includes an image sensor for generating image data of the object, the image sensor being elongated and extending in an X direction;
    an elongated first reference white board, located along one side of the window and extending in the X direction; and
    an elongated second reference white board, located along another side of the window and extending in the Y direction,
    wherein the image sensor measures the first reference white board and the second reference white board to obtain data that includes brightness variations in the Y direction, for compensating the image data when the optical scanner is powered on so as to permit quick scanning or preview.

7. The optical scanner of claim 6, further comprising an elongated third reference white board located along a further side of the window.

8. The optical scanner of claim 6, wherein the third reference white board extends in the X direction.

* * * * *

UNITED STATES PATENT AND TRADEMARK OFFICE
CERTIFICATE OF CORRECTION

| | | |
|---|---|---|
| PATENT NO. | : 7,248,388 B2 | Page 1 of 1 |
| APPLICATION NO. | : 10/812076 | |
| DATED | : July 24, 2007 | |
| INVENTOR(S) | : Ta-Yi Lee et al. | |

It is certified that error appears in the above-identified patent and that said Letters Patent is hereby corrected as shown below:

First page Item (75): Change third inventor Hsiao-Li KAO's address from "(TW)" to --(CN)--

Signed and Sealed this

Twentieth Day of November, 2007

JON W. DUDAS
*Director of the United States Patent and Trademark Office*